Nov. 19, 1963 V. G. REILING 3,111,325
FABRICATION OF SINTERABLE PLASTIC O-RING SEAL
Filed April 14, 1960
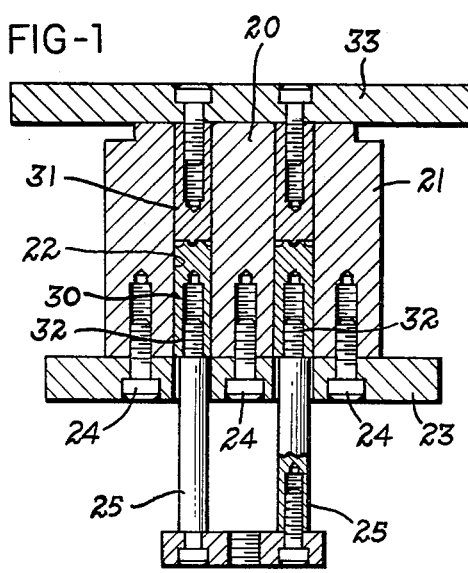
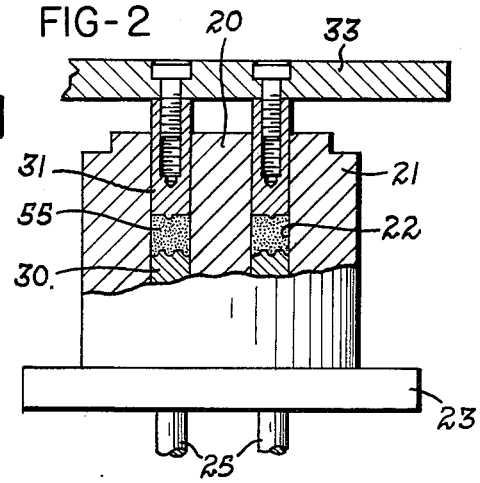
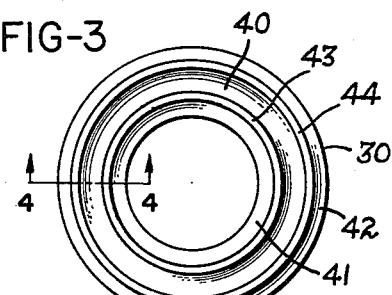
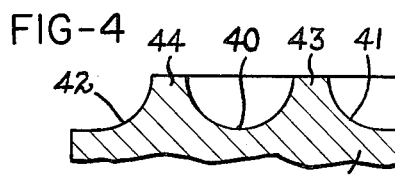
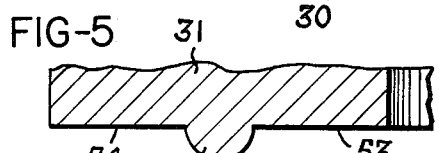
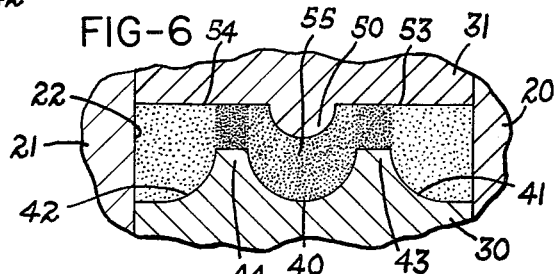
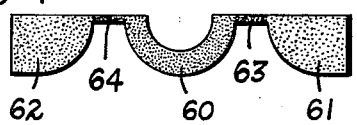
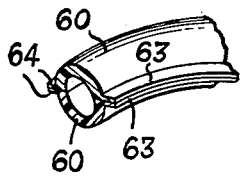
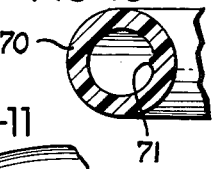
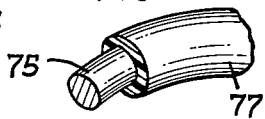
INVENTOR.
VICTOR J. REILING
BY
Marechal, Biebel, French & Bugg
ATTORNEYS United States Patent Office 3,111,325
Patented Nov. 19, 1963

3,111,325
FABRICATION OF SINTERABLE PLASTIC
O-RING SEAL
Victor G. Reiling, Dayton, Ohio, assignor to The Duriron Company, Inc., Dayton, Ohio, a corporation of New York
Filed Apr. 14, 1960, Ser. No. 22,197
1 Claim. (Cl. 277—227)

This invention relates to O-ring seals of hollow cross section and the fabrication thereof from sinterable plastic materials.

For efficient operation, an O-ring seal should be capable of sufficient deformation under pressure to flatten against opposing surfaces and thereby to increase its sealing effect, and for this reason, it has been common to construct O-ring seals from elastomeric materials such as the natural and synthetic rubbers. The fluorocarbon plastic materials typified by the tetrafluoroethylene resins sold under the trade name Teflon possess some properties which are superior to those of the elastomeric material for use in the construction of seals, and this is true also of these materials which have ben mixed or "filled" with other materials such as glass fibers, carbons, metallic powders, and pigments. For example, the fluorocarbon materials are highly inert and therefore will not contaminate other materials with which they come into contact. Also, the fluorocarbons are resistant to corrosion and will not become deteriorated by fluids which would attack the conventionally used materials such as rubber and the rubber synthetics comprising the bulk of the present day O-ring construction materials.

Another advantage of the fluorocarbon resins is that they possess an inherent lubricity which reduces the frictional resistance to movement of the seal against an opposing surface. This property is especially suitable for O-ring seals used in conjunction with pistons and fluid motors and the like. The fluorocarbon materials are not readily usable as O-ring construction materials, however, since they lack the resilience necessary for applications where limited distortion under pressure or tension is a requisite to efficient sealing action.

It is a primary object of the present invention to provide an O-ring of fluorocarbon composition and of a hollow cross section which allows necessary distortion of the O-ring under pressure but without significant loss of mechanical strength or any of the other properties which inherently suit the fluorocarbon for use as a sealing material.

It is a further object of the invention to devise a method of fabricating an O-ring seal of hollow cross section, by a series of steps which are adaptable to large scale manufacture, and are economical to practice.

Other objects and advantages of this invention will be apparent from the following description, the accompanying drawings and the appended claims.

In the drawings—

FIG. 1 is a view in vertical section through a mold assembly for producing sealing rings in accordance with the invention, with the mold parts shown in closed position;

FIG. 2 is a view similar to FIG. 1 showing the mold assembly filled with a charge of sinterable plastic material and prior to compaction of the charge;

FIG. 3 is a top view of the lower mold member in the assembly of FIGS. 1–2;

FIG. 4 is an enlarged fragmentary sectional view taken on the section line 4—4 of FIG. 3;

FIG. 5 is an enlarged fragmentary sectional view of the upper mold member showing the portion complementary with the lower mold portion in FIG. 4;

FIG. 6 is an enlarged fragmentary sectional view showing the mold members just prior to completion of the preforming operation;

FIG. 7 is a sectional view illustrating the preformed product produced as shown in FIG. 6;

FIG. 8 is an enlarged and somewhat diagrammatic sectional view illustrating the operation of joining a pair of the preformed products of FIG. 7 to form the completed O-ring seal;

FIG. 9 is a partial isometric view of the product following the operation illustrated in FIG. 8;

FIG. 10 is an enlarged sectional view through the finished ring of the invention; and FIG. 11 is a fragmentary isometric view showing a sealing ring of the invention having an insert therein.

Referring to the drawings, which illustrate preferred embodiments of the invention, FIGS. 1 and 2 show a mold assembly comprising concentric cylindrical wall members 20 and 21 which define an annular mold chamber or space 22 therebetween. The wall members 20 and 21 are secured to a base plate 23 as by bolts 24, and the base plate 23 has apertures therethrough in line with the space 22 to receive reciprocable ejector rods 25. The space 22 forms a molding chamber receiving a lower mold member 30 and an upper mold member 31 each having different working faces which are in opposing relation. The lower mold member 30 is secured at 32 to the ejector rods 25 for raising thereby, and the upper mold member 31 is shown as bolted to a pressure platen 33 for receiving the thrust force of the usual press during the preforming operation.

Referring to FIGS. 3 and 4, the lower mold member 30 is provided on its upper face with a cylindrical groove 40 of semi-circular cross section which forms an annular mold cavity and is located approximately equidistant its inner and outer peripheries. In addition, this face of the mold member 30 is provided with radially inner and outer grooves 41 and 42 which include the inner and outer edges of its working face, and each of these grooves 41 and 42 is shown as including an inner portion curved on the same radius as the groove 40 and extending for 90° and an outer portion having its lower wall extending horizontally. The relative dimension of these several grooves and the mold member are such that the inner groove 40 is separated from each of the outer grooves 41 and 42 by a narrow flat land portion 43 and 44 respectively.

The lower face of the upper mold member 31 is formed with an annular rib or boss 50 complementary with the mold cavity 40 of mold member 30 but of a substantially smaller radius of curvature, for example .0385 inch if the radius of the cavity 40 is .0695 inch. The rest of the working face of mold member 31 is completely flat with sections 53 and 54 overlying the lands 43 and 44 and the recesses 41 and 42 in mold member 30.

There is an important relation in the practice of the invention between the dimensions of the several portions of the working faces of the mold members 30 and 31, and particularly of the mold cavity and the overflow chambers defined by the grooves 41 and 42 in combination with the wall members 20 and 21. Thus the final volume of cavity 40, as determined by boss 50, defines the dimensions of the finished O-ring intermediary product thereby molded within the mold cavity, and the volumetric dimensions of this product are related to the dimensions of the two recesses 41 and 42. More specifically, the volumetric dimensions of the chambers defined the two grooves 41 and 42 with the wall members 20 and 21 should have a combined volume at least equal to that of the intermediary product to be molded, and preferably as much as twice the volume of the intermediary product. It is convenient from the standpoint of machining practice to provide these recesses 41 and 42 with the same radius of curvature as the mold cavity 40, since the same tool set up may be used. The lands 43—44 need be only a few thousandths of an inch in width, satisfactory results having been obtained, for example, with the radial dimensions of each of these lands equal to .040 inch in the case of a finished ring product approximately 1.375 inches in diameter, .140 inch in cross section, and .031 inch wall thickness.

In carrying out the preforming method of the invention by means of the mold assembly shown in FIGS. 1 to 4, the molding chamber 22 is charged with a quantity of finely divided sinterable plastic material, such as one of the Teflon molding powders, and the quantity of the charge should be substantially in excess of the final volume of the plastic intermediary product but not more than enough to fill all three of the effective cavities 40–42 in highly compacted condition. The correct quantity of charge is readily obtained by raising the mold member 30 by means of the ejector rods 25 to a height obtaining a preselected volume below the upper end of wall members 20 and 21, filling the resulting portion of the chamber 22 to the top thereof with the Teflon molding powder, and scraping the excess of the powder off the upper surface of the wall members 20—21. The lower mold member 30 is then returned to the bottom of the chamber 22, and the upper mold member 31 is inserted in the chamber 22 on top of the charge indicated at 55 in FIG. 2 and may next be pressed downwardly to compact the charge.

During the application of preforming pressure, portions of the charge 55 which lie above the lands 43 and 44 will be compacted more rapidly than the other portions of the charge. This has the apparent effect of displacing the plastic material charge laterally within the molding chamber in both directions, that is between the boss 50 and cavity 40 as well as into the two outer or overflow chambers. As the material between the flat working face of the upper mold and the lands 43—44 of the lower mold becomes more closely compacted, it acts to restrain displacement of the powder and exerts a confining effect on the powder in the cavity 40. These conditions are represented in FIG. 6 by the different densities of the hatching or stippling of the partially compacted charge 55 which illustrate that the density of the plastic material charge varies depending upon its location between the mold members.

The compacting is continued by downward movement of the upper mold member 31 until the flat working surfaces 53—54 are almost in contact with the lands 43—44, for example until they are approximately .002 inch apart. The compacted charge will then have the configuration represented in FIG. 7. Thus the center portion 60 will have been compacted substantially uniformly to the high degree of density desired in the finished seal ring. The portions 61 and 62 which were preformed in the overflow chambers will have been compacted to a lesser degree represented by the comparatively light stippling. The portions 61 and 62 are integrally connected with the center portion 60 by webs 63 and 64 of highly compacted material which is only a few thousandths of an inch thickness as previously stated.

When the mold members 30—31 are separated at the end of the preforming operation, the preformed part 60–64 can be easily removed without damage since the overflow sections 61—62 provide a convenient surface for picking the part out of the mold, in contrast with a simple ring structure which would not have a convenient gripping surface for pulling the part out of the die without causing damage to the part. It is of further significance to the mold construction that the flat surfaces on lands 43—44 are considerably less expensive and difficult to maintain than a knife edge construction. The result is that many more molding operations can be performed with the land construction and further, the webs which are formed by the lands perform an important function in the completion of the hollow ring seal, as now described.

As previously indicated, the completed hollow O-ring seal is produced in accordance with the invention by joining two of the rings or shells 60 of semi-circular section produced as described in connection with FIGS. 1–7. Before the two parts are joined, the excess portions represented by the inner and outer rings 61 and 62 are preferably trimmed away at the webs 63 and 64 leaving the webs joined to the central ring 60, and this trimmed material may be ground for reuse in subsequent preforming operations and therefore does not represent a waste of material.

Referring now to FIG. 8, two of the rings 60 with their attached webs 63 and 64 are assembled in face to face relation putting the opposed webs in contact, and this assembled pair of parts is inserted in a suitable pair of retaining members which may conveniently be a pair of mold members 30 as shown in FIG. 8, or a pair of similar clamp members provided with grooves matching the grooves 40. The two rings 60 will then be closely confined in matching cavities 40, and the opposed webs 63 and 64 will be held together by opposed lands 43 and 44 on the mold members. The mold members are then secured in this clamping relation with the plastic parts, and while thus secured together, the entire assembly is subjected to heating to the proper sintering range for the plastic material, namely a temperature in excess of 620° F. in the case of the Teflon resins.

During this heating operation, not only does the compacted powder throughout the rings 60 fuse as in the usual sintering operation, but also the opposed edges of the two ring parts 60 fuse together. A number of factors contribute to this dual result. Thus since the plastic material has a very much higher coefficient of thermal expansion than metal, and since it is confined by the cavities 40 against expansion relative to the mold members, it develops comparatively high internal pressures which are effective at sintering temperatures to cause the desired fusion of the edges of the rings. At the same time, since the two pairs of webs 63 and 64 are clamped as described, they restrain the two semi-circular rings from buckling inwardly of the cavities 40 as the material would otherwise tend to do in the absence of these webs. This action further focuses the internal pressure into the junction area of the two rings to assure their fushion without distortion.

When this sintering operation is completed and the fused rings 60 are removed from the mold or clamping, the webs 63 and 64 will also have fused together as shown in FIG. 9, but they are then readily removed by a suitable polishing operation, such as by tumbling a plurality of these products in a suitable abrasive. The final product 70 will then have the appearance shown in FIG. 10, and will have a susbtantially circular outer configuration in section. The inner periphery of the ring in section will similarly be approximately circular except there will usually be a bead along the inner edge of the seam between the two halves of the ring as indicated at 71 in FIG. 10. The resulting ring may be employed for substantially all uses for which rubber O-rings may be used, as well as in many other installations where the chemical properties of the fluorocarbon resins make them superior to other sealing materials. For all such uses, the hollow structure of the rings of this invention provide adequate flexibility without detracting from the other advantages of these materials. It is of course also apparent that the proportions of the rings of the invention are subjected to wide variation to suit particular uses.

Fusion of the semi-circular rings 60 as described in connection with FIG. 8 may be facilitated by the use of a material enhancing the adhesion between the edges of the two rings. A material suitable for this purpose is a perfluorocarbon resin available under the trade name Teflon 100–X in thin film form, and this material is compatible with the standard Teflon materials at sintering temperatures. This film material may be used for the purposes of the invention by blanking annular disks or washers of the film material of substantially the same dimension as the webs 63 and 64 and the adjacent edges of the rings 69, inserting these washers between the opposed faces of the rings and webs in the relative positions shown in FIG. 8, and then clamping the parts together and carrying out the sintering operation as already described.

It is also possible in accordance with the invention to produce a hollow O-ring seal as described which incorporates an insert member therein, such as the insert 75 in the ring 77 in FIG. 11. The insert 75 may be of any desired material, such as a metal ring of solid or hollow section, a spring, or a ring of a deformable plastice material, and the insert 75 in FIG. 11 is representative of all such materials. The incorporation of such insert is effected in the assembly of the two component semi-circular shells as described in connection with FIG. 8, and the edges of the two shells are therefore fused around the insert to complete the reinforced ring.

Cross reference is made to my application Serial No. 22,196 filed of even date herewith and assigned to the same assignee as this application.

While the articles herein described and the method and apparatus for producing such articles constitute preferred embodiments of the invention it is to be understood that the invention is not limited to these articles, method and apparatus and that changes may be made therein without departing from the scope of the invention which is defined in the appended claim.

What is claimed is:

A plastic article suitable for the manufacture of hollow O-ring sealing members comprising an annular shell including a body portion of semi-circular cross section of highly compacted finely divided sinterable plastic material of substantially uniform density throughout, a relatively thin film of said plastic material of substantially uniformly high density surrounding said body of plastic material and integral therewith, a marginal surplusage of said plastic material extending around the entire length of said body and integrally connected therewith through said thin film, and said marginal surplusage being compacted to a state of less density than said body.

References Cited in the file of this patent
UNITED STATES PATENTS

| | | |
|---|---|---|
| 2,028,021 | Shippy | Jan. 14, 1936 |
| 2,336,982 | Cremer | Dec. 14, 1943 |
| 2,456,262 | Fields | Dec. 14, 1948 |
| 2,535,634 | Hubbard | Dec. 26, 1950 |
| 2,676,823 | Olson et al. | Apr. 27, 1954 |
| 2,717,025 | Jelinek | Sept. 6, 1955 |
| 2,847,711 | Hibbard | Aug. 19, 1958 |
| 2,859,061 | Reid | Nov. 4, 1958 |
| 2,893,058 | Wurtz et al. | July 7, 1959 |
| 2,893,060 | Wills | July 7, 1959 |